United States Patent [19]

Nanko et al.

[11] Patent Number: 5,592,292
[45] Date of Patent: Jan. 7, 1997

[54] INTERFERENCE SPECTROMETER WITH A MOVING MIRROR

[75] Inventors: Tomoaki Nanko; Takeo Tanaami; Kenta Mikuriya, all of Tokyo, Japan

[73] Assignee: Yokogawa Electric Corporation, Tokyo, Japan

[21] Appl. No.: 353,679

[22] Filed: Dec. 12, 1994

[30]       Foreign Application Priority Data

Jan. 19, 1994   [JP]   Japan .................................. 6-004116

[51] Int. Cl.$^6$ ....................................................... G01B 9/02
[52] U.S. Cl. ................................................................ 356/356
[58] Field of Search .................................... 356/345, 346; 359/871

[56]                      References Cited

U.S. PATENT DOCUMENTS 4,836,678   6/1989   Okaji ........................................ 356/358
5,166,749  11/1992   Curbelo et al. ........................... 356/346
5,239,361   8/1993   Burch ....................................... 356/345

*Primary Examiner*—Samuel A. Turner
*Assistant Examiner*—Amanda Merlino
*Attorney, Agent, or Firm*—Moonray Kojima

[57]                          ABSTRACT

An interference spectrometer which causes an interference by dividing an output light from a light source into two optical paths and by changing the length of each optical path, and which comprises a moving mirror for changing the optical path lengths, position detecting means for detecting the position of the moving mirror and driving control means for controlling the position of the moving mirror, based on the output from the position detecting means. The spectrometer utilizes leaf springs to support the moving mirror, and the driving control means is driven at the natural frequency of the combined moving mirror and leaf springs and based on the output of the position detecting means. Advantageously, the invention has improved vibration resistance and improved power consumption.

7 Claims, 5 Drawing Sheets

INTERFERENCE SPECTROMETER WITH A MOVING MIRROR

BACKGROUND OF THE INVENTION

1. Field of Invention

This invention relates to an interference spectrometer, and more particularly to such spectrometer having improved vibration resistance and improved power consumption.

2. Description of the Prior Art

An interference spectrometer causes interference by dividing an output light from a light source into two optical paths and by changing the lengths of each path. Generally, a moving mirror is used to change the optical path lengths.

FIG. 1 shows one example of an interference spectrometer, such as described in Japan Patent Laid-Open 63/135,827, and comprising a beam splitter 1, a fixed mirror 2, a moving mirror 3, a compensator 4 and an air bearing 5. An incident light 100 is inputted to beam splitter 1. A part of the incident light 100 is reflected by beam splitter 1 and enters fixed mirror 2. The remainder of incident light 100 is transmitted through beam splitter 1 and compensator 4 and enters moving mirror 3. The light beams reflected from fixed mirror 2 and moving mirror 3 enter beam splitter 1 again and are outputted as interference light 101. Moving mirror 3 is provided on air bearing 5 and its position is controlled through control of air bearing 5.

FIG. 2 shows another example of an interference spectrometer, such as described in Japan UM 63/1,221, and comprising a beam splitter 1a, a fixed mirror 2a, a moving mirror 3a, diaphragms 6,7, and driving means 8.

An incident light 100a is inputted to beam splitter 1a and a part thereof is reflected by beam splitter 1a and enters fixed mirror 2a. The remainder of incident light 100a is transmitted through beam splitter 1a and enters moving mirror 3a. The light beams reflected from fixed mirror 2a and moving mirror 3a enter beam splitter 1a again and are outputted as interference light 101a. Moving mirror 3a is supported by diaphragms 6,7 and its position is controlled by driving means 8.

The example of FIG. 1, however, has a problem in that although air bearing 5 is used to smooth the motion of moving mirror 3, there is no restraint in the axial direction; hence, the mirror is subject to vibration in the axial direction.

The example of FIG. 2 also has problems in that although a certain degree of restraint in the axial direction is provided by diaphragms 6,7, a large sized diaphragm is required to move the moving mirror to any appreciable degree, and in that for all practical purposes the mirror must be driven by a large force, if restraint is strong, thereby necessitating use of a large amount of power.

There is also known a method of detecting the speed of the moving mirror by use of an interference signal from a He-Ne laser. However, in such a method, the band of the interference signal depends on the speed of the moving mirror, and control is affected thereby. Full control is difficult at lower speeds. Also, detectable resolution of the speed of the moving mirror is restricted to about one-half of the output wavelengths of the He-Ne laser.

SUMMARY OF THE INVENTION

Accordingly, an object of the invention is to overcome the aforementioned and other deficiencies, problems and disadvantages of the prior art.

Another object is to provide an interference spectrometer having improved vibration resistance of a moving mirror, and improved power consumption.

The foregoing and other objects are attained in the invention which encompasses an interference spectrometer comprising a position detecting means for detecting position of the moving mirror, a driving control means for controlling the position of the moving mirror based on the output from the position detecting means; and leaf springs for supporting the moving mirror, wherein the driving control means controls the position of the moving mirror by driving, the mirror at the natural frequency of a spring system comprising the moving mirror and the leaf spring, and based on the output from the position detecting means.

DETAILED DESCRIPTION OF THE PREFERRED EMBODIMENTS

Figure 1:
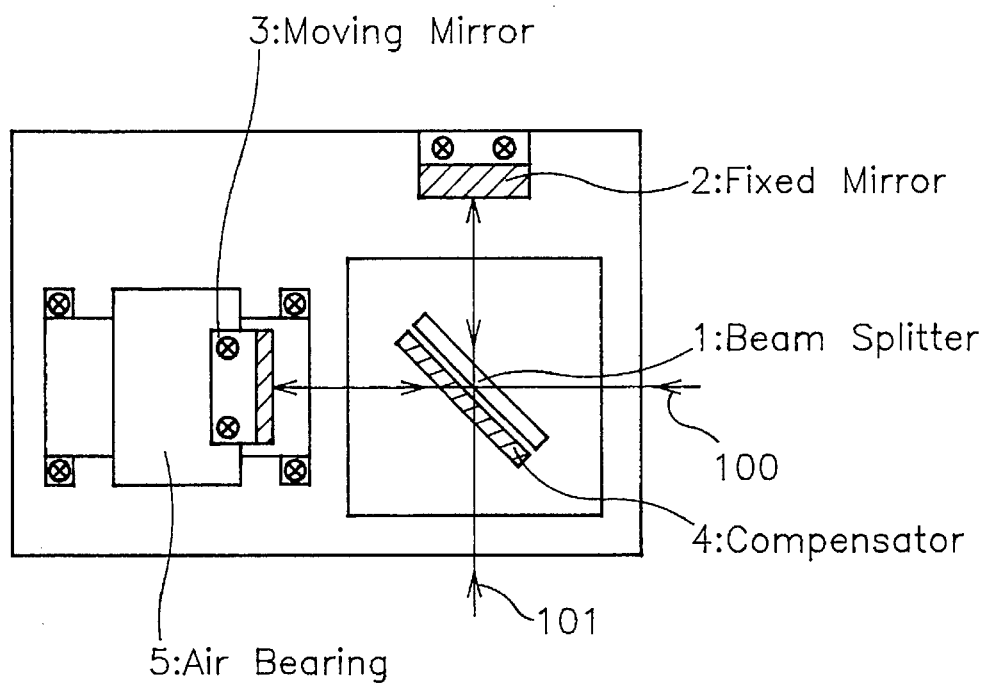
FIG. 1 is a plan view depicting a conventional interference spectrometer.
Figure 2:
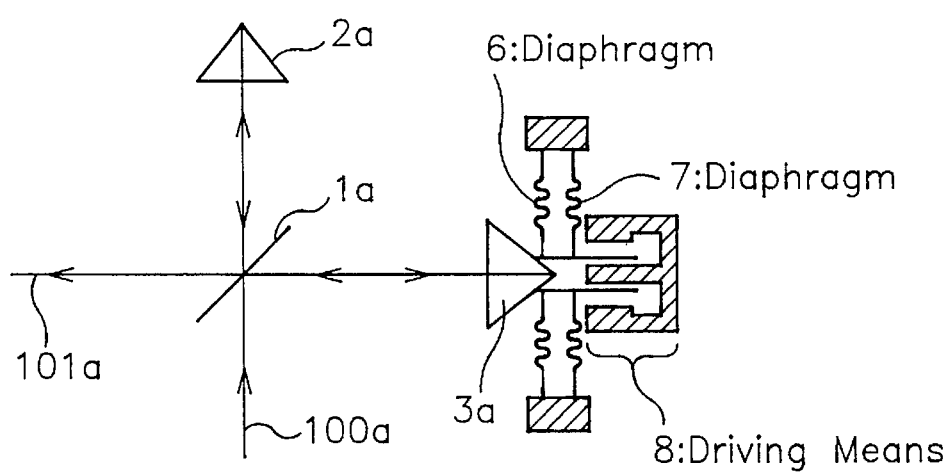
FIG. 2 is a plan view depicting another conventional interference spectrometer.
Figure 3:
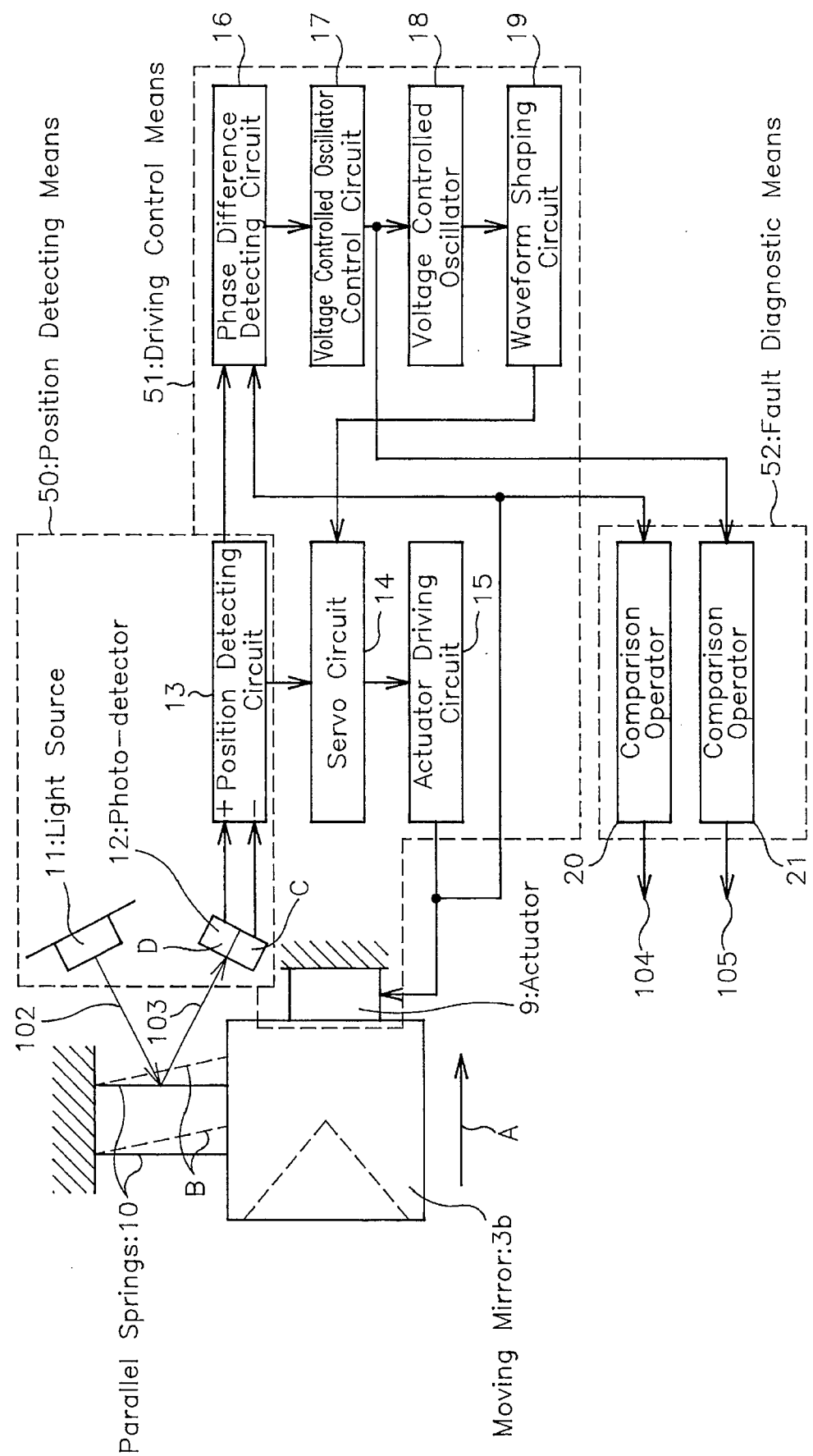
FIG. 3 is a diagram depicting an illustrative embodiment of the invention.

Turning to FIG. 3, the embodiment comprises a moving mirror 3b, such as a corner cube mirror; an actuator 9; a parallel spring 10; a light source 11, such as a laser diode; a photo detector 12, divided into two parts C and D; a position detecting circuit 13; a servo circuit 14; an actuator driving circuit 15; a phase difference detecting circuit 16; a voltage controlled oscillator control circuit 17; a voltage controlled oscillator 18; a waveform shaping circuit 19; and comparison operators 20, 21. The spectrometer operates on output light 102, reflected light 103 and fault detection signals 104,105, as explained hereinbelow.

Components 11–13 comprise a position detecting means 50. Components 9, and 14–19 comprise a drive control means. Components 20,21 comprise a fault diagnosing means 52.

Moving mirror 3b is supported by parallel springs 10 and its position is controlled by actuator 9.

Output light 102 from light source 11 is inputted to the surface of parallel springs 10 and light reflected from parallel springs 10 (called reflected light 103) is inputted to photo detector 12. Two outputs from photo detector 12 are applied, respectively, to position detecting circuit 13. The output from the position detecting circuit 13 is applied to servo circuit 14 and phase difference detecting circuit 16.

The output from servo circuit 14 is applied to actuator driving circuit 15. The output from actuator driving circuit 15 is applied to actuator 9, phase difference detecting circuit 16 and comparison operator 20.

The output from the phase difference detecting circuit 16 is applied to voltage controlled oscillator control circuit 17. The output from voltage controlled oscillator control circuit 17 is applied to voltage controlled oscillator 18 and comparison operator 21. The output from voltage controlled oscillator 18 is applied to waveform shaping circuit 19. The output from waveform shaping circuit 19 applied to servo circuit 14. The comparison operators 20, 21 produce fault detection signals 104, 105.

The FIG. 3 embodiment operates as follows. In position detecting means 50, the position of moving mirror 3b is detected by inputting the output light 102 from light source 11 to parallel springs 10, detecting reflected light 103 using photo detector 12, which is then divided into two parts, and calculating the light beams using position detecting circuit 13.

When moving mirror 3b is moved in the direction of arrow A in FIG. 3, parallel springs 10 are deformed, as shown by arrow B, so that more reflected light 103 enters part D, rather than part C, of the photo detector 12. The position of moving mirror 3b is found by calculating the difference between the two incident light beams outputted from the parts C and D of detector 12 and detected by position detecting circuit 13.

In the driving control means 51, servo circuit 14 generates a control signal so that the position signal, used to control moving mirror 3b, which is outputted by position detecting circuit 13, coincides with the position control signal, which is outputted by waveform shaping circuit 19, and based on the control signal, actuator driving circuit 15 drives actuator 9 so as to control the position of moving mirror 3b.

The phase difference detecting circuit 16 finds the phase difference between the position signal of moving mirror 3b and the output of actuator driving circuit 15, which is proportional to the force generated by actuator 9. The phase difference will become 90° when moving mirror 3b is driven at the natural frequency of a spring system comprising moving mirror 3b and parallel springs 10.

Accordingly, voltage controlled oscillator control circuit 17 controls voltage controlled oscillator 18 so that the phase difference becomes 90°, and waveform shaping circuit 19 performs filtering and adjusting of gain on the output of voltage controlled oscillator 18 and produces as an output the position control signal which is applied to servo circuit 14.

In fault diagnosing means 52, a fault is determined by monitoring the output from actuator driving circuit 15 and voltage controlled oscillator control circuit 17. That is, when actuator 9 does not operate because of a disconnection or the like, the output from actuator driving circuit 15 turns out to be a large value, as compared to that during normal operation. Furthermore, when parallel springs 10 deteriorate due to metallic fatigue or the like, the natural frequency of the spring system changes. The fault is determined by comparing the output from actuator driving circuit 15 and change of output from voltage controlled oscillator control circuit 17, which results from the change of natural frequency from the normal values, by use of comparison operators 20,21.

Figure 4:
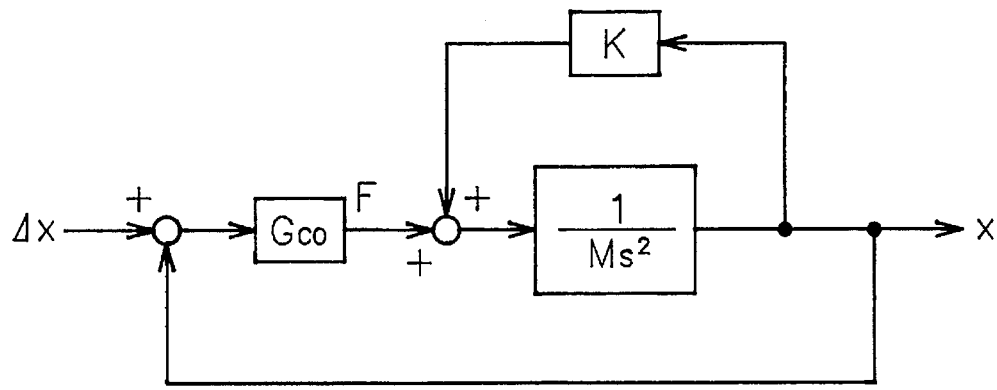
FIG. 4 is a block diagram depicting a control system for the embodiment of FIG. 3.

The operation when the moving mirror 3b is driven at the natural frequency of the spring system will be explained in detail with reference to FIGS. 4–6. FIG. 4 shows a control system of the FIG. 3 embodiment, wherein K denotes the spring constant of parallel springs 10; $G_{ca}$ denotes the transfer function of actuator 9, servo circuit 14 and actuator driving circuit 15; M denotes the weight of moving mirror 3b; s denotes the differential operator; F denotes the driving force generated by actuator 9; x denotes the displacement from the neutral position of the moving mirror 3b; $\Delta X$ denotes the position control signal of mirror 3b.

Under the above mentioned conditions, the transfer function G from the position control signal $\Delta X$ to the driving force F may be expressed as follows:

$$\begin{aligned} G &= F/\Delta X \\ &= G_{ca}/[G_{ca}/(K+Ms^2)] \\ &= K+Ms^2 \end{aligned} \quad (1)$$

Figure 5:
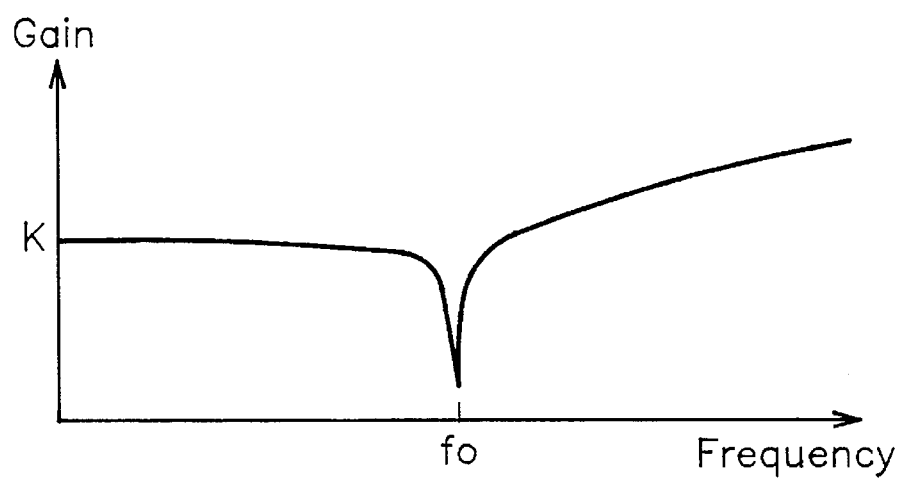
FIG. 5 is a graph depicting the frequency characteristics of the gain of the transfer function.

FIG. 5 shows a plotted curve of the gains of equation (1), which is the transfer function. When actuator 9 is driven by a resonance frequency Fo; i.e., $$fo = \frac{1}{2\pi}(K/M)^{1/2} \quad (2)$$

driving force F may be smaller, i.e., less power is consumed, if the position control signal $\Delta X$ is varied at a constant amplitude.

Figure 6A:
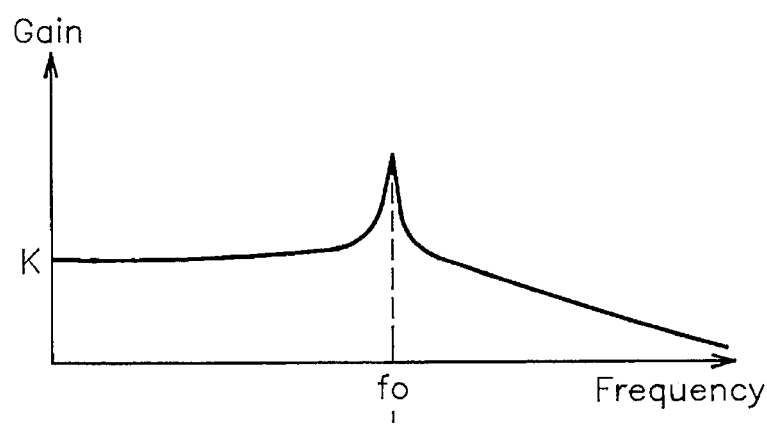
FIGS. 6A and 6B are graphs depicting Bode diagrams of the transfer function.
Figure 6B:
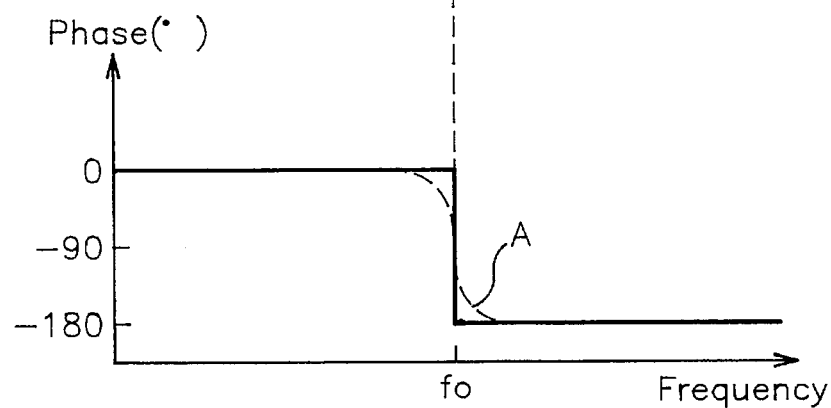

The transfer function G from driving force F to the displacement from the neutral position X is:

$$G' = X/F = 1/(K+Ms^2) \quad (3)$$

and Bode diagrams or the transfer function G' becomes as shown in FIGS. 6A and 6B.

Although the phase changes stepwisely by 180° at the point of the resonance frequency fo in FIG. 6B, it actually does not change stepwisely as shown in the figure because of the damping effect of the materials. It changes mildly more or less as shown by the broken line A, so that it may be controlled by driving control means 51 so that it becomes 90°.

As a result, the vibration resistance may be enhanced by supporting moving mirror 3b using parallel springs 10 and by detecting the position of moving mirror 3b to control the position thereof and power may be saved by driving at the natural frequency of the spring system.

Figure 7:
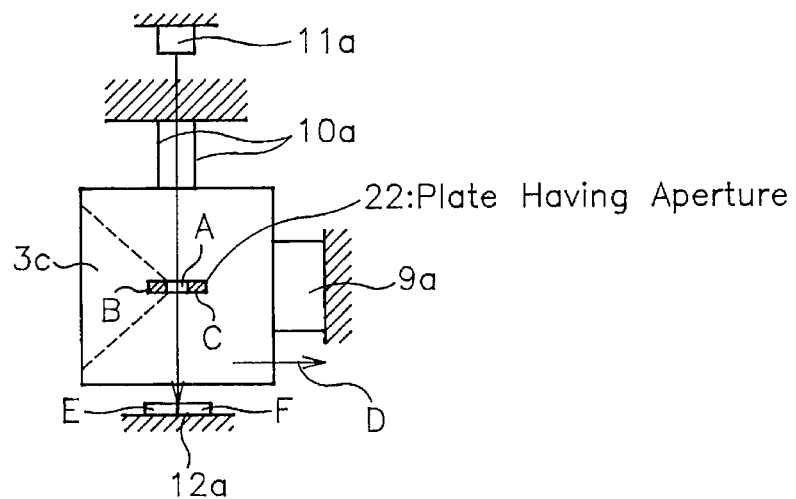
FIG. 7 is a drawing depicting main parts of another illustrative embodiment of the invention.

FIG. 7 shows another embodiment wherein position detecting circuit 13, driving control means 51 and fault diagnosing means 52 are omitted for sake of clarity of description. The spectrometer comprises a moving mirror 3C, an actuator 9a, a parallel spring 10a, a light source 11a, a photo diode 12a divided into two parts, and a plate 22 having an aperture. Components 11a,12a and position detecting circuit 13 (shown in FIG. 3, but not in FIG. 7) comprise a position detecting means 50a.

The FIG. 7 embodiment is different from the FIG. 3 embodiment in that plate 22, having the aperture, is attached to moving mirror 3c and light source 11a and photo detector 12 are disposed so that the output light from source 11a is transmitted through the aperture and the transmitted light enters photo detector 12a. In plate 22, a portion A is the aperture, and portions B and C block the output light from light source 11a. When moving mirror 3c is moved in the direction of arrow D, for example, the aperture is also moved in the direction of D, thereby decreasing the light entering the portion E of detector 12a and increasing the light entering portion F of detector 12a. As a result, the position of moving mirror 3c may be found, similarly to the embodiment of FIG. 3, by finding the difference of light beams impinging at portions E and F of detector 12a.

Figure 8A:
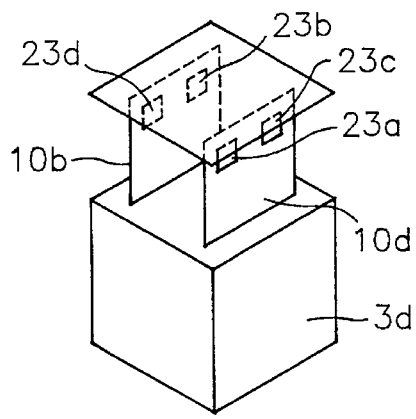
FIG. 8A is a drawing depicting the main parts of a further illustrative embodiment of the invention.
Figure 8B:
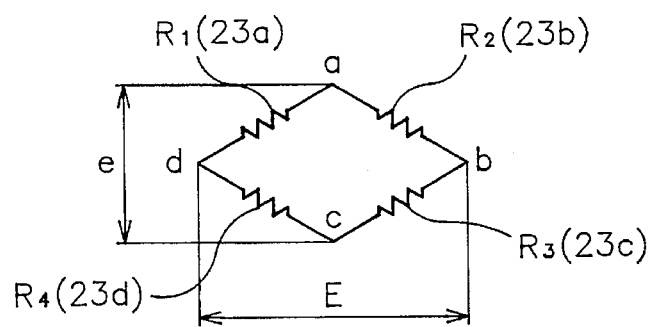
FIG. 8B is an equivalent circuit diagram of a bridge formed by the strain gauges of FIG. 8A.

FIGS. 8A, 8B illustrate another embodiment, wherein driving control means 51 and fault diagnosing means 52 are omitted for clarity of description. In FIG. 8A, the spectrometer comprises a moving mirror 3d, parallel springs 10b, 10d and strain gauges 23a–23d. The FIG. 8A embodiment differs from the FIG. 3 embodiment in that moving mirror 3b is supported by parallel springs 10b,10d; strain gauges 23b, 23d are attached to parallel spring 10b; and strain gauges 23a and 23c are attached to parallel spring 10d, respectively; and a bridge circuit is formed by strain gauges 23a–23d (see FIG. 8B). That is, the position of moving mirror 3d is detected, not optically, but by gauging the strain.

FIG. 8B shows an equivalent circuit of a bridge circuit formed by strain gauges 23a–23d. The operation of the FIG. 8A embodiment will now be explained with reference to FIG. 8B. A voltage E is applied between points b and d in FIG. 8B, to detect the potential difference e between points a and c. Consider that the resistance values of strain gauges 23a–23d are equal, respectively, to R1, R2, R3, and R4; a distortion factor of each of the strain gauges 23a–23d is $K_3$; and strains which result in each of strain gauges 23a–23d are $\epsilon 1$, $\epsilon 2$, $\epsilon 3$, and $\epsilon 4$.

Under those conditions, the potential difference e may be expressed, approximately, as follows:

$$e=K_s*E*(\epsilon 1-\epsilon 2+\epsilon 3-\epsilon 4)/4 \quad (4)$$

Consider also the strain in the axial direction $\epsilon_a$ and the strain caused by torsional vibration as $\epsilon_t$, assuming that the absolute value of the strain caused by the move of the moving mirror 3d in the axial direction and that of the strain caused by the torsional vibration are equal in the strain gauges 23a–23d.

when the move in the axial direction and the torsional vibration are applied to the strain gauges 23a–23d, the strain $\epsilon 1$ through $\epsilon 4$ may be expressed as follows:

$$\epsilon_1=\epsilon_a-\epsilon_t \quad (5)$$

$$\epsilon_2=-\epsilon_a-\epsilon_t \quad (6)$$

$$\epsilon_3=\epsilon_a+\epsilon_t \quad (7)$$

$$\epsilon_4=-\epsilon_a+\epsilon_t \quad (8)$$

where a direction into which the strain extends is positive.

Here, when equations (5)–(8) are substituted for equation (4), the following equation is obtained:

$$e=K_s*E*\epsilon_a \quad (9)$$

As a result, the strain in the axial direction, i.e., the position only in the axial direction, may be found by constructing the bridge circuit by providing the parallel springs 10b,10c and strain gauges 23a–23d and by detecting the potential difference generated in the bridge circuit.

Furthermore, the position detecting means may be downsized because the strain gauges used in FIG. 8A, and temperature compensation and position detection error may be eliminated by constructing the bridge circuit using the strain gauges.

Also, the vibration resistance is enhance by controlling the position of the moving mirror by detecting its position, not by driving it at the natural frequency of the spring system. In that case, the method for supporting the moving mirror is not confined only to the use of parallel springs. Moreover, the invention is not confined to use of optical means or strain gauges to detect the position of the moving mirror. Other suitable means can be used. Moreover, the fault diagnosing means 52 may be omitted since it is not essential.

As is apparent from the above description, the invention has many advantages; such as, for example, improved vibration resistance in the moving mirror by detecting the position thereby to control same; improved power consumption by driving the moving mirror at the natural frequency of the mirror and spring.

The foregoing description is illustrative of the principles of the invention. Numerous extensions and modifications thereof would be apparent to the worker skilled in the art. All such extensions and modifications are to be considered to be within the spirit and scope of the invention.

What is claimed is:

1. An interference spectrometer which causes an interference by dividing an output light from a light source into two optical paths and by changing a length of each optical path, said spectrometer comprising:

a moving mirror for changing said optical path lengths;

a pair of parallel leaf springs for supporting said moving mirror;

position detecting means for detecting a position of said moving mirror, said position detecting means comprising means for transmitting a signal to one of said pair of parallel leaf springs and means for detecting another signal reflected by said one of said pair of parallel leaf springs; and driving control means for controlling position of said moving mirror by driving said moving mirror at a natural frequency of a spring system comprising said moving mirror and said pair of parallel leaf springs, and based on an output of said position detecting means.

2. An interference spectrometer which causes an interference by dividing an output light from a light source into two optical paths and by changing a length of each optical path, said spectrometer comprising a moving mirror for changing said optical path lengths;

position detecting means for detecting a position of said moving mirror; and driving control means for controlling position of said moving mirror based on an output from said position detecting means; wherein said position detecting means comprises a plate attached to said moving mirror, a light source for irradiating light to said plate, a photo detector for detecting light transmitted through without being blocked by said plate, and means for detecting position of said moving mirror based on said transmitted light.

3. The spectrometer of claim 2, wherein said plate has an aperture; and wherein, said means for detecting the position of said moving mirror detects light transmitted through said apertures.

4. An interference spectrometer which causes an interference by dividing an output light from a light source into two optical paths and by changing a length of each optical path, said spectrometer comprising a moving mirror for changing said optical path lengths;

position detecting means for detecting a position of said moving mirror; and driving control means for controlling position of said moving mirror based on an output from said position detecting means; wherein said position detecting means comprises strain gauges provided at a section of said moving mirror, and means for detecting position of said moving mirror based on strains produced by said strain gauges at said section of said moving mirror.

5. The spectrometer of claim 4, wherein said strain gauges form an electrical bridge at said section of said moving mirror.

6. An interference spectrometer which causes an interference by dividing an output light from a light source into two optical paths and by changing a length of each optical path, said spectrometer comprising a moving mirror for changing said optical path lengths;

a pair of parallel leaf springs attached to said moving mirror;

position detecting means for detecting position of said moving mirror; and driving control means for controlling position of said moving mirror based on an output from said position detecting means; wherein said position detecting means comprises a light source for irradiating light to said pair of parallel leaf springs attached to said moving mirror, a photo detector for detecting a reflected light from said pair of parallel leaf springs, and means for detecting position of said moving mirror based on said reflected light from said pair of parallel leaf springs.

7. The spectrometer of claim 6, wherein said position detecting means comprises means for detecting absolute displacement of said moving mirror.

* * * * *